Figure 1:
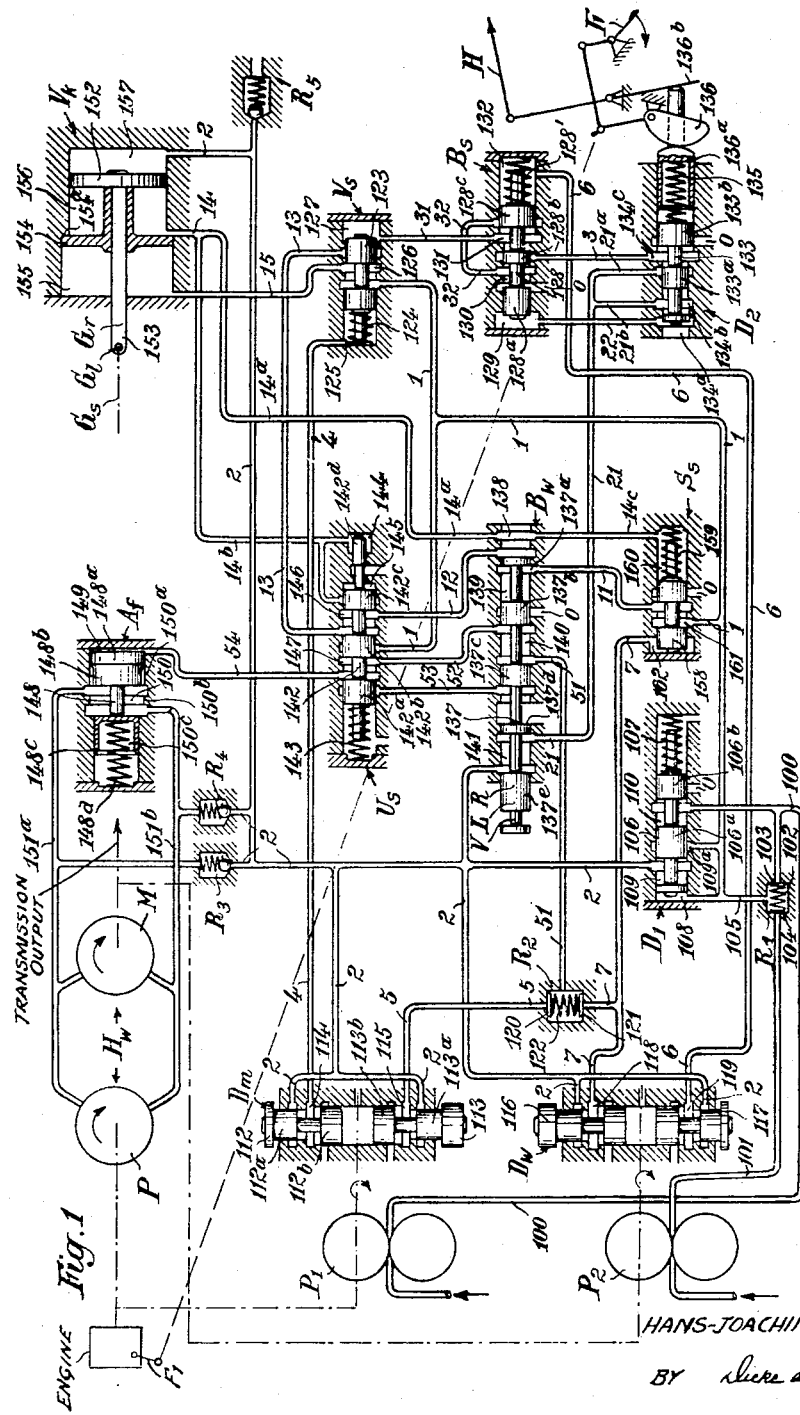

HANS-JOACHIM M. FÖRSTER
BY Dicke and Craig.
ATTORNEYS.

=== Page 1 ===

United States Patent Office 2,972,224
Patented Feb. 21, 1961

2,972,224

AUTOMATIC CONTROL SYSTEM, PARTICULARLY FOR HYDROSTATIC TRANSMISSIONS

Hans-Joachim M. Forster, Stuttgart-Bad Cannstatt, Germany, assignor to Daimler-Benz Aktiengesellschaft, Stuttgart-Unterturkheim, Germany Filed Dec. 17, 1956, Ser. No. 628,736

Claims priority, application Germany Dec. 16, 1955

12 Claims. (Cl. 60—19)

My invention relates to an automatic control system, particularly for hydrostatic transmissions in motor vehicles.

It is the primary object of the present invention to provide an improved control system for controlling the ratio of transmission of a continuously variable transmission in a reliable manner during all conditions of operation of a motor vehicle including forward travel under motor power.

More particularly it is an object of the present invention to provide an improved control system which will adapt itself to the various conditions of operation and, more particularly, will act in dependence on the engine power.

The advantage of such power control is primarily based on the fact that during travel at a slow speed and at a comparatively low power demand, the motor vehicle is ordinarily operated with a very low rotary engine speed. When the member controlling the motor power, for example, a travel-controlling pedal, is adjusted to its full-power position, the rotary speed of the engine is increased to its permissible maximum limit. When that happens it is desirable, however, to prevent a racing of the engine in order to avoid undesirable noise adversely affecting the comfort of the passengers and to avoid the increased fuel consumption incurred coincidentally to such racing of the engine. Therefore, it is another object of the present invention to provide a control system which reduces the maximum rotary speed of the engine of the motor vehicle in dependence on the speed of travel of the vehicle or on the rotary speed of the driven shaft of the transmission, such system limiting the permissible maximum rotary speed of the engine preferably within the noise limit. As a result the permissible maximum rotary speed of the engine will be increased as the rotary speed of the driven shaft increases. Preferably such control is effective within a lower range of rotary speeds of the engine. At or beyond the upper boundary of such range the permissible maximum rotary speed coincides with the attainable maximum rotary speed of the engine. In a preferred embodiment of the invention being of particular utility I have provided means for cancelling the limitation of the rotary speed and for permitting an increase thereof, preferably up to the possible maximum rotary speed of the engine. As a result the full motor power of the engine operating at the maximum rotary speed is available whenever required under special circumstances.

For the purpose of cancelling the limitation of the rotary speed I preferably provide a speed control member which may be adjusted arbitrarily or automatically and precedes the speed limiting member. Preferably the speed control member is adjusted in dependence on the power control member, adjustment to an overload position causing the speed limiting controller or the control members cooperating therewith to be influenced in a manner shifting the transmission to a lower speed. Preferably, however, means are provided at the same time which permit the speed control member to be also adjusted independently of the power control. As a particular result, the engine may be operated so as to act as a brake, the driver, for instance, determining manually the minimum rotary engine speed with the effect that the speed of the engine will not drop below such limit even when the power control member is returned by the driver. In a system of this character the entire range of conditions of operation of the vehicle may be coordinated to the power control member in the braking position thereof. This may be exemplified by the fact that where the travel control pedal is returned to its limit position, the engine throttle is closed and the engine is operated at its maximum rotary speed so as to produce the maximum braking effect. When the driver starting from this position steps on the pedal, this will have the initial effect of reducing the rotary engine speed from its maximum to a minimum, for instance, to a zero point in which the engine is in its normal idling condition, further depression of the pedal causing the engine throttle to be opened and the rotary engine speed to be increased accordingly. The first range of operation with a closed throttle valve is succeeded by a range in which the engine produces a driving couple.

Preferably the rotary speed limiting member is constituted by a control slide valve adjustable by opposing forces, the first force of which may be supplemented by spring pressure exerted by a pressure fluid controlled in dependence on the speed of the driven shaft of the transmission or speed of travel of the vehicle, such valve controlling the cooperative connection extending from the pressure regulating member to the transmission actuating mechanism or to a control or adjusting mechanism preceding the same, the second force being such that the speed limiting member will control the transmission actuating mechanism, increasing the driving couple acting on the driven shaft of the transmission. Preferably the speed limiting member comprises a differential piston slide valve cooperating with the pressure fluid acting directly or indirectly with the transmission-actuating device in such a manner that after the duct leading from the pressure regulating member to said actuating device or a setting mechanism preceding such actuating device has been unthrottled, the pressure fluid tends to maintain the speed limiting member in such position additionally even when the pressure which is controlled by the power control member set to overload position and normally acts upon the speed limiting member ceases to act thereon. Hence, a sort of hysteresis effect is produced. Preferably the control member of the speed controller adjustable in dependence on the power output is constituted by a differential piston slide valve.

The speed controller preferably acts indirectly through the intermediary of an adjustable slide valve or a similar control member upon the actuating or ratio-changing device of the transmission, particularly the hydrostatic transmission. The slide valve controlling the actuating mechanism causing it to move between a low ratio of transmission ("overdrive") and a high ratio of transmission preferably effecting such control continuously is under the dual control by a first fluid pressure governed by the speed limiting controller and by a second fluid pressure depending on the rotary engine speed, such dual control being so effected that said first fluid pressure tends to increase the ratio of transmission (slow speed and high torque of driven shaft), whereas said second fluid pressure tends, as the engine speed increases, to shift the transmission to a lower ratio (higher speed of the driven shaft). Preferably, however, the system so cooperates with a range selector slide valve that when the same is set to idling and/or to reverse the transmission-actuating mechanism is so influenced, while the transmission-actuating mechanism is in one end position and when it is in the other end position, that beneath a comparatively low speed of the driven shaft the ratio of transmission will be increased to a high value (low speed and powerful torque of the driven shaft) but will be reduced to a low value above said limit. This purpose may be served, for instance, by a locking member depending on the speed of the driven shaft and operative to effect such control by alternative closing and opening of a communicating duct. Primarily, such a control of the transmission in idling condition has the advantage that the engine may be readily started by towing or pushing the vehicle. Since the production of the force required for jerking the engine from its resting condition is insured, the starting of the engine may be effected in a very smooth manner free from shocks. By subsequently shifting the control to forward travel the engine is slowly accelerated. The ratio of transmission set up automatically depends in such operation on the selected position of the power control member for instance and, as the case may be, simultaneously on the speed of travel of the vehicle. As soon as the vehicle has reached a certain speed the transmission is automatically shifted towards the overdrive condition. If the transmission would have been set to overdrive while the vehicle is at rest and the control is set to "idling," an excessive interval would expire until the control system would respond to a reverse command. Moreover the readiness to start would be adversely affected if the range selector slide valve meanwhile would have been set to idling, for example, when the vehicle stops in front of a red traffic light at a crossing.

Moreover the function of the locking member, for example, a locking slide valve, may insure that the reverse operation of the transmission will not become effective unless the speed of travel is below a predetermined limit. As a result hazardous conditions of operation are avoided.

In a particularly useful and simple embodiment of my invention the transmission-actuating device comprises two co-axial pistons such as a main piston connected with the transmission setting member and an auxiliary piston axially slidable relative to the main piston and adapted to perform but portion of the stroke of the main piston, both pistons being so controlled by appropriate admission ports that both pistons may be jointly moved, particularly for the purpose of shifting the transmission to overdrive and of shifting the transmission to a low speed of travel, to the end positions of the auxiliary piston and that the main piston, particularly for the purpose of setting the transmission to reverse, may be moved therebeyond into another end position, the auxiliary piston being arrested by means of a stop.

The limitation of the engine speed is preferably effected by fluid pressure, the fluid being controlled by a centrifugal governor driven by the driven shaft of the transmission whereas another centrifugal governor driven by the engine governs, for instance, the setting mechanism preceding the transmission actuating device.

Further features and objects of my invention will appear from the description of a preferred embodiment of my invention following hereinafter with reference to the accompanying drawings. It is to be understood, however, that the invention is in no way limited to the details of such embodiment but is capable of numerous modifications within the scope of the appended claims.

Moreover it is to be understood that the terms and phrases used in such detailed description have been chosen for the purpose of illustrating the invention rather than that of restricting or limiting the same.

Figure 2:
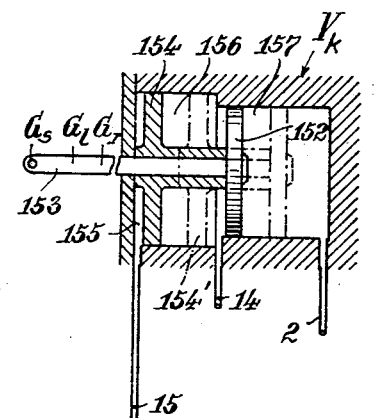
Figure 3:
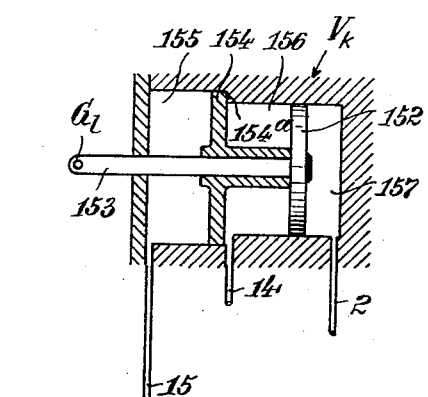
Figure 4:
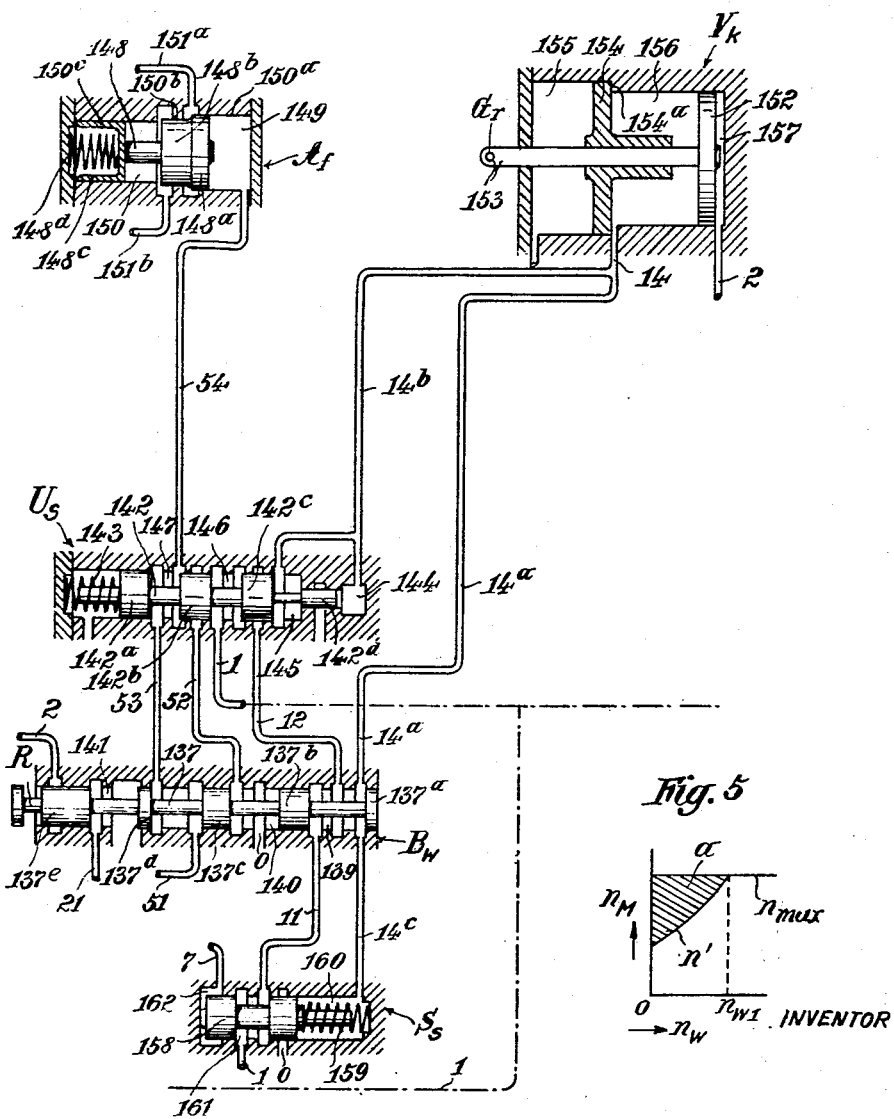
Figure 5:
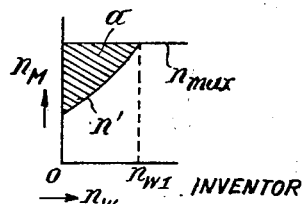

In the drawings illustrating hydraulic circuit diagrams
Fig. 1 represents the entire system, the speed control member being set to an average power output, Fig. 2 illustrates a portion of the circuit diagram of Fig. 1 illustrating the speed control member set to a low power output, Fig. 3 shows the same portion of the circuit diagram as Fig. 2 illustrating the speed control member set to a high power output, Figs. 1, 2 and 3 showing the range selector slide valve set to forward travel;

Fig. 4 illustrates another portion of the circuit diagram showing the range selector slide valve set to reverse and Fig. 5 is a graph illustrating the controlling effect.

The control system illustrated in Fig. 1 comprises a plurality of slidable valve pistons which may have a common housing. Since the disposition and shape of the housing has no bearing on the invention, such housing is neither shown nor will it be described. Most of the valve pistons to be described hereinafter are operable by fluid pressure, preferably by oil or any other suitable viscous liquid. Some of the valves, however, are operable by hand levers or pedals. The transmission of the motor vehicle controlled by my novel system may be of any desired continuously variable type. Preferably it is of the hydrostatic type comprising a pump P connected with the engine to be driven thereby and circulating a suitable liquid, such as oil, through a fluid motor M geared to the driven wheels of the vehicle. The pump or the pump and the motor are of the variable delivery type. Since hydrostatic transmissions of that type are well known in the art, a detailed description thereof is deemed dispensable. The ratio of the transmission is determined by an actuating device generally designated by reference character $Vk$ including a member 153 movable between two extreme positions $Gs$ and $Gr$. When the actuating device is in the position $Gs$ it sets the transmission to a low ratio of the speed of the engine driven pump to that of the fluid motor M driving the wheels of the vehicle or, in other words, to overdrive. Movement of member 153 towards its other extreme position $Gr$ increases the ratio of transmission $P/M$. When the position $Gl$ is reached the engine running at a high speed will drive the vehicle at a very low speed. A full stop of the vehicle will be reached when the ratio is increased to infinite. In this condition the pump P although rotating at a very high speed delivers no liquid, thus holding the fluid motor M at rest. Therefore, the engine is idling while the vehicle stops. When member 153 moves beyond this idling position, it reverses the pump P causing the same to drive the fluid motor in reverse direction at gradually increasing speed until the position $Gr$ is reached. My novel control system to be described hereinafter serves the purpose of controling the actuating device $Vk$ in dependence on the rotary speed of the engine measured by a pilot pump P1 geared to the engine, on the speed of travel of the vehicle measured by a pilot pump P2 geared to the driven shaft of the transmission driving the wheels of the vehicle, on the position of the gas pedal or other power control member F, on the position of a brake actuating member such as a brake hand lever H, and on the position of a range selector lever not shown which may be mounted on the steering colummn of the vehicle and is connected with a range selector slide valve $Bw$ including a slidable valve piston capable of being set by the range selector lever to any one of three positions V, L and R.

The pilot pumps P1 and P2 feed the liquid through ducts 100 and 101 to a valve housing R1 including a pair of individual check valves 103 and 104 pressed apart by a spring 102. These check valves are operative at any time to close the duct leading to that pilot pump that produces the lower pressure, whereas the liquid fed under a higher pressure enters the housing R1 and through a port 105 enters a conduit system 1 including a plurality of communicating pipe sections leading to various valves.

The various pressure fluid circuits are designated by numbers comprising a single digit and two digits, the single digit denoting such conduits which communicate with the valve housing R1 being fed by the pilot pumps P1, P2, to wit the ducts 1, or which are fed via a controller D1, to wit duct 2, or which are fed via a controller D2, to wit duct 3, or which are fed via controllers $Dm$ and $Dw$, to wit ducts 4, 5, 6 and 7. The numbers comprising two digits, to wit a basic digit supplemented by one of the digits 1, 2, 3, 4 and 5 denote such conduits as subdivide the fluid circuits 1, 2, 3, 4, 5, 6 and 7 by additional control members.

All of the ducts and conduits shown in Fig. 1 serve to conduct fluid under pressure. Moreover this system includes a plurality of return conduits serving to return the liquid from outlet ports designated by O to the sump from which the fluid is sucked up by the pilot pumps P1 and P2. Such return pipes or conduits are omitted in the drawing for sake of clarity. The pressure controller D1 serves as a control member determining and maintaining an increased actuating pressure in the pipe system 1. The pressure controller comprises a slidable valve member 106 composed of piston sections 106a and 106b and subjected to the pressure of a spring 107 tending to move it to its left end position. Moreover the pressure controller D1 is provided with pressure or control cavities 108, 109 and 110 communicating with a feed duct 1 and an output or discharge duct 2 therefor, the latter leading to a plurality of valves including pressure control valves $Dm$ and $Dw$. When the valve member 106 of the pressure controller D1 is in its right-hand end position, it establishes a communication between the conduit 100 and a discharge port O.

The valve housing includes a pair of rotors, each rotor being connected for common rotation with one of the pilot pumps P1, P2 in the direction indicated by arrows. Each rotor is provided with a diagonal bore for the accommodation of slidable valve pistons constituting flyweights. One rotor and the pistons slidable therein constitute a centrifugal governor $Dm$ and the other rotor and the slidable valve pistons movable therein constitute another centrifugal governor $Dw$. Each rotor is provided with a plurality of ports and suitable means not shown are provided to establish a communication between each port and the conduit system. For sake of simplicity the conduits are shown as being directly connected with such ports, whereas, in reality, no such direct connection is possible because of the rotation of the rotors relative to the stationary housing containing the ducts or conduits.

The centrifugal governer $Dm$ which may be mounted on the shaft of the pilot pump P1 for instance is provided with the radially movable differential piston 112 composed of the piston portions 112a, 112b and with the radially movable differential piston 113 composed of the piston portions 113a, 113b and with pressure spaces 114 and 115. The centrifugal governor $Dm$ communicates with the feed conduit 2 and with discharge or output conduits 4, 5. The pressure oil entering the spaces 114, 115 from the conduit 2 urges the two differential pistons towards each other and towards the axes of rotation of the rotor. The admission of pressure liquid will be closed by the pistons, however, when the same arrive at a predetermined radial position. The centrifugal force acting upon the pistons 112, 113, urges the pistons apart contrary to the pressure of the fluid and thus tends to unthrottle the admission of liquid. From the cooperation of the two opposing forces the pressure prevailing in the conduits 4 and 5 respectively results.

The rotor of the centrifugal governor $Dw$ which may be mounted for instance on the shaft of the pilot pump P2 includes in a similar manner the two radially movable differential pistons 116 and 117 and is provided with pressure spaces 118 and 119. This governor communicates with the feed conduit 2 and with the output or discharge conduits 6, 7. In principle, the operation is the same as that of the governor $Dm$.

The conduits 5 and 7 lead to a valve housing R2 enclosing a pair of check valves 120 and 121 subject to the force of a closing spring 122. Depending on which of the pressures availing in the ducts 5 and 7 is larger, the check valve 120 or the check valve 121 will be opened. Hence, one or the other of the two conduits 5 and 7 will be alternatively put in communication with the conduit 51.

This system further includes a speed control valve D2 including a differential piston 133 having a smaller piston portion 133a and a larger piston portion 133b and being provided with pressure or control spaces 134a, 134b and 134c which communicate with conduits 22, 21a, 21b and 3 or may be put in communication therewith. A spring 135 tends to move the piston 133 to the left with reference to Fig. 1. The speed control valve D2 cooperates with the power control member which in the instant case is constituted by the accelerator pedal F of the vehicle. Upon depression of the power control pedal F a cam 136 connected therewith will bias the spring 135 to a larger or lesser degree by displacement of a sleeve 136a. If desired, the valve D2 may also cooperate with a hand lever, e.g. a hand brake lever H, acting upon the sleeve 136a through the intermediary of a linkage 136b. It is the primary function of the speed control member D2 to control the transmission in dependence on the power demand, i.e., particularly in dependence on the position of the accelerator pedal F or in dependence on a brake actuating member H or any other actuating member having the tendency of increasing the ratio of transmission, thus increasing the driving torque.

Another valve included in the system is the speed limiting valve $Bs$ having the function within the lower range of speeds to limit the speed of the engine determined by the speed control valve D2 to a maximum rate which increases as the speed of travel of the vehicle increases. When the accelerator pedal F is kicked down all the way, however, the speed limiting valve $Bs$ will be disabled and therefore cannot effect such a speed limitation. The valve $Bs$ includes a slidable valve piston 128 composed of spaced piston portions 128a, 128b, 128c and is provided with pressure spaces 129, 130, 131 and 132. Moreover the valve includes a spring 128' mounted to urge the piston 128 to the left. The ports controlled by the valve piston are connected with conduits 6, 3, 22 on the one side and with ducts 31 and 32 on the other side. The fluid passing from conduit 3 into conduit 31 will be cut off when the rotary speed of the vehicle exceeds a certain limit, such limit depending on the pressure prevailing in the conduit 6.

Moreover the control system includes a slide valve $Vs$ operative to initiate the movement of the transmission-actuating device $Vk$ for forward speeds. The valve $Vs$ is connected with the conduit 1 and includes a piston 123 and a spring 124 tending to move the piston 123 to the right-hand end position. Moreover the valve includes pressure spaces 125, 126 and 127. Also, the valve communicates with the conduits 31, 13 and 15.

Another valve included in the control system is the range selector slide valve $Bw$ which has been mentioned hereinabove. This valve includes the slidable valve member 137 composed of the piston portions 137a, 137b, 137c, 137d and 137e and is provided with control or pressure spaces 138, 139, 140 and 141. The valve communicates with the feed conduits 2, 11 and 51 and with the outlet or discharge conduits 21, 12, 14a, 14c, 52 and 53. The valve member is adapted to be set manually to any one of three basic positions V, L and R, the position V serving for forward travel, the position L serving for idling and the position R serving for driving in reverse.

Another valve included in the control system is a slide valve $Us$ having the function of initiating the movement of the actuating device $Vk$ for reverse travel of the vehicle. The valve $Us$ includes a piston 142 having spaced piston portions 142a, 142b and 142c and a spaced piston portion 142d of smaller diameter. Moreover the valve includes a spring 143 tending to move the slidable piston member into its uttermost right-hand position. The valve is provided with the pressure spaces 144, 145, 146 and 147 and is connected with the feed conduits 1, 12, 14b, 52 and 53 and with discharge conduits 13 and 54. It is the function of the valve Us to shortcircuit the transmission Hw composed of the variable pump P and the fluid motor M, while the transmission is being shifted from forward to reverse in order to prevent excessive pressures from being produced and to prevent an undesirable reversal of the torque.

Another valve included in the control system is a locking valve Ss including a slidable piston 158 and a spring 159 urging such piston towards the extreme left position. The valve is provided with pressure spaces 160, 161 and 162 and is connected with conduits 1, 7, 11 and 14c. When the piston member 158 is moved to the right, it will connect the conduit 11 with a discharge port O connected to a return pipe. It is the function of this valve Ss when moved to its extreme right-hand position to prevent the actuating device Vk from shifting the transmission to reverse while the speed of forward travel of the vehicle exceeds a predetermined admissible limit.

Moreover the control system includes a starting slide valve Af for shortcircuiting the transmission Hw, the valve Af being controlled by the range selector slide valve via the valve Us and the conduit 54. The valve Af includes a slidable piston member 148 composed of piston-shaped portions 148a, 148b and 148c having different diameters. This valve member is slidable in coaxial bores 150a and 150c and a space 150b is provided intermediate the piston-shaped portions 148b and 148c of the valve member. Moreover the valve includes a spring 148d tending to move the valve member into the extreme right-hand position. Its chamber 149 provided in the extreme end of bore 150a of the valve body communicates with a conduit 54, whereas the control space 150 is in permanent communication with a duct 151b and may be connected under control by piston portion 148b with a duct 151a. The two ducts 151a and 151b communicate with the pressure port and the suction port of the pump P of the transmission. Therefore, the transmission is shortcircuited when the valve member 148 assumes the position shown in Fig. 1 establishing a communication between the ducts 151a and 151b. As a result, no torque will be transmitted from the engine to the driven shaft of the transmission.

The shortcircuit is cancelled by movement of the piston member 148 to the left under pressure prevailing in the conduit 54 and the chamber 149 respectively, such pressure overcoming the spring 148d.

The pressure duct and the return duct of the hydrostatic transmission Hw are connected with the conduit system 2 through check valves R3 and R4 which serve to keep the ducts of the transmission in filled condition. The pressure prevailing in the conduit system 2 is limited by a relief valve R5 and is thus maintained at a predetermined limit.

The actuating device Vk which serves to shift the hydrostatic transmission Hw for the purpose of determining the ratio of transmission includes a main piston 152 rigidly mounted on a piston rod 153 connected with the transmission shifting member not shown and an auxiliary piston 154 disposed co-axially to the main piston. Moreover the actuating device is provided with pressure spaces 155, 156 and 157 and is connected with the conduits 2, 14 and 15.

When the piston rod 153 is moved into the extreme left position, a low ratio of transmission is set up between the driving shaft and the driven shaft of the transmission resulting in overdrive condition. When the piston rod 153 is moved to the intermediate position Gl a higher ratio of transmission is set up causing the driven shaft to rotate at a low speed and to transmit a high torque. The transmission may be shifted to reverse by movement of the piston rod to the position Gr. The adjustment to reverse is effected by movement of the piston 152 to its extreme right-hand position as shown in Fig. 4, the auxiliary piston 154 being arrested by a shoulder 154a of its cylinder. The ratio of transmission is continuously varied by movement of the piston rod 153 between the positions Gs and Gl.

The operation is as follows:

When the vehicle is at rest and the engine is idling, the secondary pilot pump P2 is at rest, whereas the primary pilot pump P1 feeds liquid to a limited extent. Hence, in the valve housing R1, the check valve 103 will open, whereas the check valve 104 remains closed. The liquid passing from the valve housing R1 via the duct 105 to the pressure space 108 of the pressure regulating slide valve D1 will shift the valve piston 106 contrary to the tendency of spring 107 to the right. Upon displacement through a certain distance the piston 106 will establish a communication between the control groove 109a and the duct 1 connected therewith, on the one hand, and the pressure space 109 connected with the duct 2 on the other. When that happens, the flow of liquid passing from the duct 1 to the duct 2 will be throttled reducing the pressure prevailing in the duct 2. In this manner an accurate pressure will be maintained in the two conduits 1 and 2 having, for instance, a ratio of 1:½. When the pressure prevailing in the duct 1 reaches a predetermined limit, the piston portion 106b will uncover a discharge port O permitting the liquid to escape from the duct 100 through the space 110 and a return conduit communicating with the discharge port O. In this manner a predetermined pressure will be maintained in the conduit 100 supplied by the pilot pump P1.

The pressure liquid supplied by the conduit 2 is distributed over the centrifugal controllers Dm and Dw acting on the differential pistons 112, 113, and 116, 117 respectively. When the pistons move outwardly under the centrifugal force, the liquid is admitted to the pressure spaces 114 and 115. Under the counteracting forces exerted by the pressure liquid supplied by conduits 2 and exerted by the centrifugal force, speed-responsive pressures will be maintained in the conduits 4, 5 and 6, 7.

The conduits 2 supply the liquid under pressure to the range selector slide valve Bw. When the driver has set this valve for forward travel into the position V illustrated in Fig. 1, the liquid passes from conduit 2 via a space 141 to a conduit 21 and thence through branch pipes 21a and 21b to the speed control slide valve generally designated by reference character D2.

With the valve Bw in the position V the chamber 149 of the start valve Af is connected with the valve R2 by means of the conduit 51, the valve space 140, the conduit 52, the control space 147 of the valve Us and the conduit 54. For the time being engine is running but at a low speed. Therefore, low pressure only prevails in the conduit 5 leading to the valve R2. When this pressure opens the valve 120, it will be transferred to the chamber 149 of valve Af but will be too low to move the valve piston 148 to the left. Therefore, the piston 148 of the start valve Af remains in the extreme right-hand position shown in Fig. 1. Consequently, the pump P of the transmission Hw is short-circuited via the ducts 151a and 151b and the control space 150. The fluid motor M of the transmission will not produce any power.

In Fig. 1 the elements are shown in a position which they assume when pressure prevails in the space 127 of the valve Vs holding the valve piston 123 in the extreme left end position. As a result the pressure prevailing in conduit 1 will be transferred through the space 126 and the conduit 15 to the space 155 of the transmission-actuating device Vk. Therefore, the piston 154 is maintained in the position abutting shoulder 154a, thus keeping the actuating rod 153 in the central position Gl illustrated in Fig. 1. In this position the ratio of transmisison is a maximum suitable for starting the vehicle, the transmission being capable of driving the driven shaft at a low speed and with a high torque.

Let us now consider the function of the control system which results from an adjustment of the range selector slide valve to the position L which is the idling position. Other than in the position V the communication between the conduits 51 and 52 is interrupted and the conduit 52 is connected with the discharge port O. Hence, pressure fluid will no longer be conducted to chamber 149 of the valve Af through the conduits 51, 52 and 54. Similarly, the communication between the conduits 2 and 21 is interrupted by the piston portion 137e of the valve Bw, while a communication is established between the conduits 11 and 12 through the control space 139. As a result, a movement of the piston 148 of the start valve Af to the left is impossible and the transmission remains shortcircuited through the conduits 151a and 151b. The control space 127 of the valve Vs which communicates with the space 141 of the range selector slide valve Bw through conduit 31, control space 131 of valve Bs, conduit 3, control space 134c, and conduits 21a and 21 is relieved from pressure since the control space 141 is now cut off from conduit 2 and is connected with a discharge port. Therefore, the valve piston 123 of the valve Vs will be moved by spring 124 to the extreme right-hand position which is illustrated in Fig. 2. Nevertheless pressure will be transferred from the conduit 1 to the conduit 15 because both conduits are interconnected by the following communication: Conduit 15, control space 126 of valve Vs, conduit 13, control space 146 of valve Us, conduit 12, control space 139 of valve Bw, conduit 11, control space 161 of the valve Ss and conduit 1, the valve piston 158 of the valve Ss being in its extreme left-hand position, because the centrifugal controller Dw is at rest permitting the piston 116 to assume its extreme inner position in which the control space 118 and duct 7 communicate with a discharge port. Because of the communication between the conduits 1 and 15 just traced pressure is maintained in the space 155 of the actuating device Vk maintaining the pistons 154 and 152 in the position shown in Fig. 1.

The communication between the conduits 1 and 15 is conditional, however, upon a zero velocity or a very low velocity of the vehicle, such as may occur when the vehicle is being pushed within the garage. As soon as the speed of the vehicle increases with the range selector slide valve being set to its idling position L, rotation of the centrifugal governor Dw causes the piston 116 to disconnect conduit 7 from the exhaust port and to connect it with the conduit 2, whereby pressure is transferred through the conduit 7 to the control space 162 of the valve Ss moving the piston 158 thereof to the right. As a result, the conduit 11 is connected with the exhaust port O of the valve Ss, thus relieving space 155 of the actuating device Vk from pressure via conduits 15, 13, 12 and 11. The fluid pressure supplied by conduit 2 to the chamber 157 acting upon piston 152 will move the two pistons 152 and 154 and the rod 153 to the extreme left-hand position Gs setting the transmission to overdrive.

Let us now assume that the range selector slide valve Bw has been set by the driver to its V position and that the driver depresses the accelerator pedal F intending to start the vehicle. As a result, the engine is accelerated and increases the rotary speed of the centrifugal governor Dm whereby pressure is built up in conduit 5. This pressure is transferred to the chamber 149 of the starter valve Af via valve housing R2, conduit 51, control space 140 of valve Bw, conduit 52, control space 147 of valve Us, and conduit 54. Hence, the piston 148 of the starter valve Af is moved to the left and interrupts the communication between the ducts 151a and 151b. Therefore, the shortcircuit of the transmission is cancelled and the transmission commences to transfer power.

During the travel of the vehicle the comparatively low pressure prevailing in the conduit system 2 acts permanently upon the piston 152 tending to move same towards the overdrive position Gs. This tendency is overcome, however, by pressure prevailing in space 155 and acting upon the piston 154, such pressure being supplied through the communication traced hereinbefore.

Depression of the accelerating pedal F increases the bias of the spring 135 through the intermediary of the cam 136 thereby imposing a higher load upon the valve piston 133 of the valve D2. As a result, the pressure prevailing in the conduit 3 will be increased since the communication between the conduit 21a and the control space 134c will be unthrottled, whereas the communication of the control space 134c with the discharge port O will be throttled to a higher extent. Hence, it will appear that the pressure prevailing in the conduit 3 is commensurate to the depression of the accelerator pedal F. In such control the fluid pressure prevailing in the control space 134c and acting upon the different areas of the end faces of the piston portions 133b and 133a cooperates with the spring 135.

When the accelerator pedal F is substantially in its initial position in which the throttle of the engine is closed or substantially closed, a low pressure prevails in the conduit 3. The valve piston 128 of the valve Bs will then be kept in its extreme left position because the liquid under pressure admitted from the conduit 3 into the control space 131 acting upon the piston portion 128c of larger diameter is unable to overcome the combined force exerted by the spring 128' and by the possible pressure liquid admitted to the control space 132 by the conduit 6 under the control by the centrifugal governor Dw should the vehicle be moving. Hence, the communication between the conduit 3 and the control space 131 and the conduit 31 connected thereto will be unthrottled and the pressure prevailing in the control space 127 of the valve Vs will become substantially equal to the pressure prevailing in conduit 3. As a result, the valve piston 123 of the valve Vs will move so far towards the right as to disconnect the conduit 15 from the conduit 1 containing liquid under pressure and to connect conduit 15 with the conduit 13 which is put on discharge via control space 146 of valve Us, conduit 12 and control space 138 of valve Bw. As a result, liquid will be discharged from the space 155 of the actuating device Vk permitting the permanent pressure prevailing in the space 157 to move the pistons 152 and 154 to the left. The consequent change of the ratio of transmission causes the effective load on the engine to be changed so that the rotary speed of the engine is effectively and indirectly controlled in dependence on the pressure set up by the valve D2 in the conduit 3. The displacement of the pistons 152 and 154 will be stopped as soon as they reach an intermediate position 154' (Fig. 2) between the overdrive position Gs and the high ratio position Gl.

When the driver depresses the accelerator lever F, for instance, into the position shown in Fig. 1, it being assumed that the vehicle is travelling at a low velocity, then the pressure set up in the conduit 3 and in the control space 131 of the valve Bs will reach an amount acting on the differential area of the piston portions 128b and 128c sufficient to overcome the effect of the spring 128' and the effect of the fluid pressure admitted through conduit 6 into the control space 132. Consequently, the piston 128 will move towards the right whereby the communication of the control space 131 and the conduit 31 with the duct 3 will be throttled, whereas the communication thereof with the discharge port O through the duct 32 will be unthrottled. Consequently, such pressure will be set up in conduit 31 as is required to balance against the forces tending to move valve piston 128 to the left. Such pressure set up in conduit 31 will be lower than that prevailing in conduit 3. Lower pressure in conduit 31 causes the valve Vs however to effect a displacement of the pistons of the actuating device Vk resulting in a change of the rotary speed of the engine, such speed being so controlled as a result of the function of the valve Vs as to be commensurate with the pressure prevailing in conduit 31 which is lower than that prevailing in conduit 3. Hence, it will appear that the speed set up by the function of the valve Vs will now be determined by the pressure prevailing in conduit 31 and will be prevented from increasing upon further depression of the accelerator lever F.

The dependency of the rotary speed $n_M$ on the speed of the driven shaft of the transmission commensurate with the rate of travel of the vehicle is illustrated in Fig. 5. It will appear that the engine speed is represented by a curve $n'$ indicating the rise of the engine speed from a comparatively low value, when the vehicle is at rest up to a maximum value when the vehicle is travelling at a speed, commensurate with a rotary speed $n_{W_1}$ of the driven shaft of the transmission, such maximum value being $n_{max}$. The cross hatched area $a$ denotes the engine speeds which are blocked out by the speed limiting valve Bs.

Fig. 3 shows what happens when the accelerator pedal is kicked down to its lowermost position. The valve piston 133 of the pressure regulating valve D2 is moved to its extreme left position and establishes a communication between the ducts 21b and 22. Therefore, liquid under a predetermined pressure prevailing in conduit 2 is admitted via control space 141 of valve Bw, conduit 21, conduit 21b, control space 134b and duct 22 and is supplied to the control space 129 of the speed limiting valve Bs. As a result, the piston 128 is moved to the extreme right-hand position and establishes an unthrottled communication between conduit 2 and the control space 127 of the valve Vs, such communication extending through conduit 2, control space 141 of valve Bw, conduit 21, conduit 21a, control space 134c of valve D2, conduit 3, control space 130 of valve Bs, conduit 32, control space 131 of valve Bs and conduit 31. Therefore, the speed limiting valve Bs will no longer limit the rotary speed of the engine. The full pressure prevailing in conduit 1 produced by the pilot pump P1 will be admitted through conduit 15 to the space 155 of the actuating device Vk and will move the piston 154 towards the right, thereby increasing the ratio of transmission and consequently permitting the engine to pick up rotary speed until the consequent rise of pressure in conduit 4 under control by the centrifugal governor Dm moves piston 123 to the right disconnecting conduit 15 from conduit 1 and connecting it with discharge conduit 13.

When the driver after having kicked down the accelerator pedal F releases the same again, the conduit 22 will be disconnected from the conduit 21b and will be put on discharge, thus relieving control chamber 129 of valve Bs from pressure. Nevertheless the valve piston 128 of valve Bs will be maintained in its extreme right-hand position as long as the pressure in conduit 6 controlled by the centrifugal governor Dw in proportion to the rate of travel of the vehicle remains insufficient to overcome the pressure exerted by the liquid admitted through the conduits 3 and 32 upon the differential area of the piston sections 128b and 128c. Only when the pressure prevailing in conduit 3 will be lower than the combined pressures exerted by the spring 128' and the liquid admitted through conduit 6, will the piston 128 return to its extreme left position.

From the foregoing description it will be understood that movement of the valve Vs to the left causes the transmission-actuating device Vk to increase the ratio of transmission by admission of liquid under pressure from conduit 1 via control chamber 126 and conduit 15 to the chamber 155 of the actuating device Vk. Such actuation of the rod 153 is effected whenever the force exerted by the spring 124 combined with the force exerted by the pressure admitted to space 125 from conduit 4 and controlled by the centrifugal governor Dm in proportion with the rotary speed of the engine will be overcome by the pressure prevailing in the control chamber 127 of the valve Vs. This condition, however, prevails whenever the rotary speed of the engine is inferior to the speed selected by the adjustment of the power control member F.

Fig. 4 illustrates what happens when the range selector slide valve Bw is set to its reverse position R. A communication will be established extending from the conduit 1 normally kept under a predetermined pressure via space 161 of valve Ss, conduit 11, space 139 of valve Bw, conduit 14a and conduit 14 to the chamber 156 of the actuating device Vk. While the chamber 156 is being filled, the pressure in conduit 1 will drop considerably below the magnitude normally maintained by the pressure control valve D1. The amount to which the pressure in conduit 1 will drop depends on the amount of the counter-pressure prevailing in chamber 157 and on the force that must be exerted by the rod 153 upon the transmission to change the ratio thereof. Only when piston 152 will have arrived in its extreme end position will the pressure prevailing in space 156 rise to the normal level maintained by the pressure control valve D1. This pressure is communicated through the duct 14b to the chamber 144 of the valve Us. The valve piston 142 is so dimensioned that the pressure acting on the end face of the piston portion 142d of small diameter during the displacement of the piston 152 is insufficient to overcome the force of the spring 143. As soon, however, as the piston 152 has arrived in its extreme right-hand position, the pressure in control space 144 rises moving the piston member 142 to the left. Hence, it will appear that after the valve Bw is set to its R position, initially the valve Us will remain in its normal condition shown in Fig. 1 establishing a communication extending from the chamber 149 of the shortcircuiting valve Af through the conduit 54, the control space 147 of the valve Us, the conduit 52, the control space 140 of the valve Bw to a discharge port. Hence, the chamber 149 will be relieved from pressure and the piston 148 of the valve Af will move to the shortcircuiting position shown in Fig. 1. As a result, an excessive increase of pressure in the transmission is avoided during the reversal of the torque. After the pressure in the control space 144 has been built up and has moved the valve member 142 of the valve Us to the left into the position illustrated in Fig. 4, liquid under pressure will be supplied to the chamber 149 as soon as the engine is sped up, such pressure liquid being supplied from the centrifugal governor Dm, via conduit 5, valve housing R2, conduit 51, conduit 53, control space 147 of valve Us and conduit 54. Hence, the shortcircuit of the transmission will be cancelled and the transmission will transmit power for reverse travel.

When the driver shifts the range selector slide valve Bw from its R position, the piston portion 137a will put the control groove 138 on discharge, thus permitting the piston 152 moving to the left under the pressure prevailing in chamber 157 to displace the liquid from the chamber 156 through the conduit 14a. During such movement of the piston 152 a pressure will be maintained therein which depends on the flow resistance encountered by the flow of liquid in the conduit 14a. This pressure is communicated to the control spaces 144 and 145 of the valve Us and acts on the piston portions 142c and 142d keeping the valve piston 142 in its extreme left position and thus interrupting the communication between the conduits 52 and 54 until the pressure prevailing in chamber 156 has dropped to zero upon arrival of piston 152 in its end position. Thereafter only will the valve member 142 of valve Us return to the right.

While the invention has been described in connection with a preferred embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains, and as fall within the scope of the invention or the limits of the appended claims.

What I claim is:

1. In a motor vehicle having an engine provided with engine adjusting means for varying the torque produced by the engine, an automatic control system for a continuously variable transmission, especially for a continuously variable hydrostatic transmission having input means operatively connected with said engine and output means, said control system being operative to vary, at any given setting of said engine adjusting means, the transmission ratio of said transmission and to thereby vary the effective load on the engine to indirectly limit effectively the maximum speed of the engine, comprising transmission actuating means operatively connected with said transmission for shifting the same to vary the transmission ratio thereof and thereby effectively limit the maximum permissible engine speed to a predetermined value, control valve means operatively connected with said engine-torque adjusting means and operative in dependence on the setting of said engine-torque adjusting means, first speed-responsive means operative in response to the speed of said output means, and hydraulic connecting means operatively connecting said control valve means with said transmission actuating means for controlling said transmission actuating means by said control valve means including speed limit means controlling the connection between said control valve means and said actuating means and operatively connected with said first speed-responsive means for influencing the shifting movement of said transmission actuating means in the sense of a decrease in the engine load and therewith in the sense of an increase of said maximum permissible engine speed in dependence on said first speed responsive means upon increase of the speed of said output means, and second speed responsive means operatively connected with said hydraulic control means for effectively influencing the shifting movement of said controlling means in response to the engine speed.

2. A control system according to claim 1, wherein said speed limit means includes a speed limiting valve and spring means normally urging the speed limiting valve in one direction thereof, pressure-fluid producing means for producing fluid under pressure including a source of fluid pressure dependent on the speed of said output means, said control valve means being adjustable over the normal operating range of said engine adjusting means corresponding to positions from the idling to the full-load position thereof and including an additional position beyond the full-load position thereof, said connecting means connecting said source of fluid pressure with said speed limiting valve to normally actuate the same in said one direction by the pressure produced by said source and also connecting said pressure producing means with said speed limiting valve to eliminate the speed limiting function thereof and thereby enable shifting by said actuating means of said transmission to a lower transmission ratio upon movement of said control valve means to said additional position beyond the full-load position thereof.

3. A control system according to claim 1, wherein said control valve means includes an adjustable control valve, and wherein said speed limit means includes a speed limiting valve hydraulically interconnected with said control valve, and wherein said engine adjusting means is operatively connected with said control valve for arbitrarily adjusting said control valve beyond its normal adjusting range to thereby effectively eliminate the speed limiting effect of said speed limiting valve and therewith enable an increase in the speed of said engine to the highest possible value.

4. A control system according to claim 1, further comprising vehicle brake operating means operatively connected with said control valve means to adjust said control valve means in response to actuation of said vehicle brake operating means independently of said engine adjusting means.

5. An automatic control system according to claim 2, wherein said actuating means includes a slide valve, and wherein the combined control pressure acting on said slide valve after opening the connection between said control valve means and said slide valve by said speed limiting valve tends to maintain said speed limiting valve in the open position even after the pressure of the fluid medium controlled by said control valve means in the overload position thereof and acting on the speed limiting valve ceases.

6. An automatic control system according to claim 5, wherein said speed limiting valve is formed as a differential piston, the piston surfaces of said differential piston facing each other being acted upon by the pressure of the pressure medium prevailing in the section of said connecting means between said speed limiting valve and said control valve means which seeks to displace said speed limiting valve in opposition to the pressure exerted thereon by the fluid medium within said system which is produced by said source and which is dependent on the speed of said output means.

7. A control system according to claim 6, wherein said speed limiting valve is provided with a control edge which is operative by the pressure in said section of the connecting means to seek to close said connecting section in opposition to the pressure of the fluid medium acting on said speed limit valve which is produced by said source and is dependent on the speed of the output means, said control edge being adjusted against the action of the fluid pressure from said second source, with said engine output control means and said control valve operatively connected thereto positioned in an overload position, in such a manner that a bypass is opened by said speed limiting valve that provides an essentially unthrottled connection between said control valve means and said actuating means to thereby effect an adjustment of the actuating means into a position in which said hydrostatic transmission produces a relatively high torque.

8. An automatic control system according to claim 2, wherein said pressure fluid producing means includes a source of fluid pressure dependent on the speed of said engine, further comprising a shifting-control slide valve controlling the shifting movements of said transmission between a relatively higher speed setting and a relatively lower speed setting in a stepless manner and in such a way that the fluid pressure controlled by said control valve means acting on said speed limiting valve seeks to adjust said transmission actuating means into low gear, on the one hand, and the fluid pressure produced by said last-mentioned source and responsive to the engine speed seeks to adjust said actuating means to said relatively higher speed setting, on the other.

9. A control system according to claim 2, wherein said system includes a range selector slide valve adapted to be adjusted to a number of operating positions thereof and hydraulically interconnected by said connecting means, one position of said range selector being the idling position in which position said range selector slide valve provides fluid pressure in said system to move said actuating means to a relatively low speed position when the speed of the output means does not exceed a certain predetermined value and to a relatively high speed position when the speed of said output means exceeds said certain predetermined value.

10. A control system according to claim 9, wherein said system includes a locking valve hydraulically interconnected with said range selector slide valve and said actuating means by said connecting means, said locking valve being hydraulically adjusted in response to the speed of said output means in such a manner as to enable flow of the pressure fluid to said range selector slide valve and to said actuating means for shifting said transmission into low gear only when the speed of said output means does not exceed a certain predetermined limit.

11. A control system according to claim 2, wherein said system includes a range selector slide valve having a plurality of positions including a reverse position, and wherein said actuating means includes cylinder means, piston means including two pistons slidably arranged in said cylinder means to form three pressure chambers, one of said chambers formed between one of said pistons and said cylinder means being acted upon by a pressure fluid medium within said system having substantially constant pressure, another chamber being formed by the other piston and said cylinder means and acted upon by a pressure fluid medium controlled by said control valve means in response to the operation of said control valve means and of said speed limiting valve, and the third pressure chamber formed intermediate said two pistons being supplied by a pressure fluid medium only when said range selector slide valve is shifted to the reverse position.

12. A control system according to claim 1, wherein said first speed-responsive means includes a first speed responsive governor operatively connected with said output means, wherein said second speed-responsive means includes a second speed responsive governor operatively connected with said input means, said hydraulic connecting means including a slide valve, said second governor being hydraulically interconnected with said slide valve and controlling the pressure medium in said system which influences the position of said slide valve so as to shift said transmission into high gear when the speed of said input means is increased, and said first governor being hydraulically interconnected with said speed limiting valve and controlling the pressure of the fluid medium in said system that effects the movements of said speed limiting valve.

References Cited in the file of this patent

UNITED STATES PATENTS

| | | |
|---|---|---|
| 1,172,412 | Von Saalfeld | Feb. 22, 1916 |
| 1,981,805 | Kacer et al. | Nov. 20, 1934 |
| 2,359,423 | Johnson | Oct. 3, 1944 |
| 2,370,710 | Blair | Mar. 6, 1945 |
| 2,500,580 | Segsworth | Mar. 14, 1950 |
| 2,505,727 | Vickers et al. | Apr. 25, 1950 |
| 2,516,662 | Vickers et al. | July 25, 1950 |
| 2,556,378 | Sisson | June 12, 1951 |
| 2,603,943 | Evernden | July 22, 1952 |
| 2,657,918 | Parker | Nov. 3, 1953 |
| 2,721,072 | Zuhn et al. | Oct. 18, 1955 |